Dec. 30, 1947.  E. KROPP  2,433,670
CATALYTIC REACTION APPARATUS
Filed Nov. 1, 1941
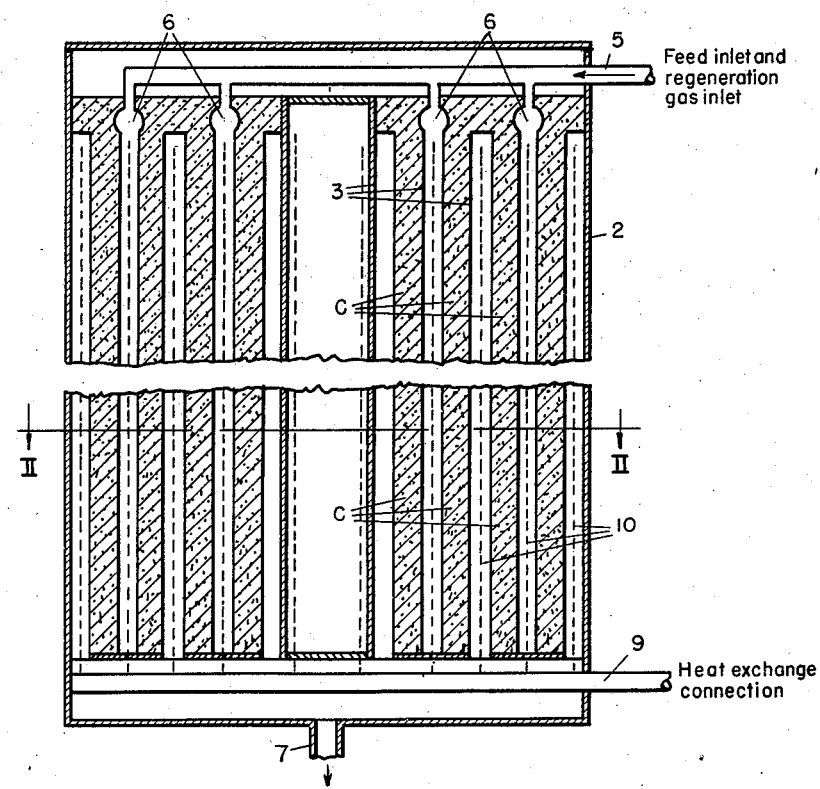
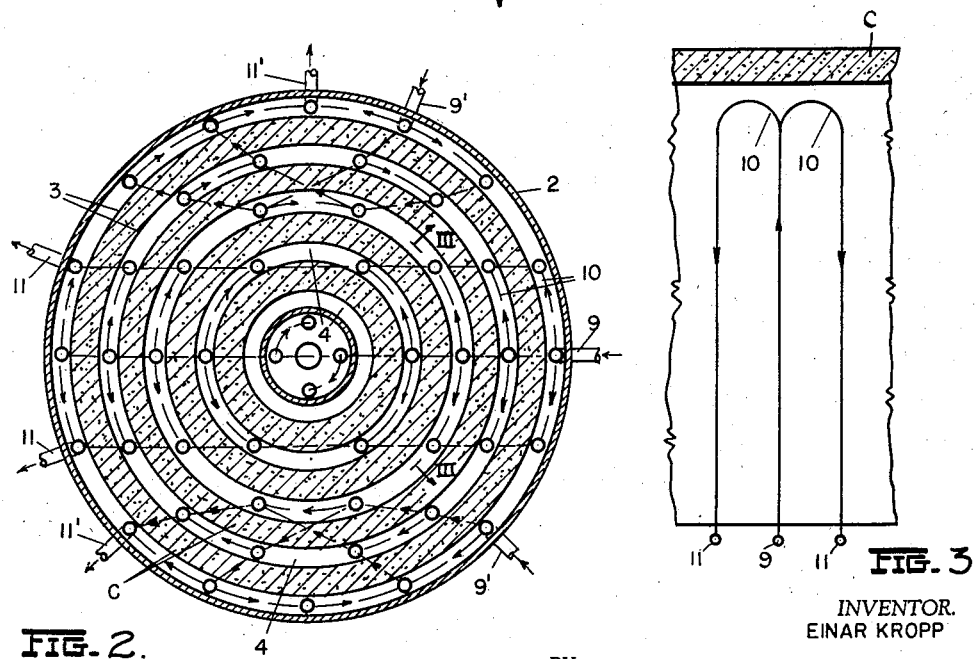
INVENTOR.
EINAR KROPP
BY Oberlin, Limbach & Day.
ATTORNEYS Patented Dec. 30, 1947

2,433,670

UNITED STATES PATENT OFFICE 2,433,670

CATALYTIC REACTION APPARATUS

Einar Kropp, Cleveland, Ohio, assignor to The Standard Oil Company, Cleveland, Ohio, a corporation of Ohio Application November 1, 1941, Serial No. 417,561

1 Claim. (Cl. 23—288)

In catalytic reaction apparatus for operation on gaseous material, for instance hydrocarbon gases to be dehydrogenated, aromatized, etc., it has been customary to arrange a series of catalyst beds in superposition one above another, and piping connections have been provided to distribute the gas to be catalyzed and the gas for regeneration, corresponding outlet piping being provided for these respectively, and conventionally in the trays there have been arranged heat exchange coils with connections for feed and discharge. All of this has required elaborate and complicated piping and a multitude of valves, adding greatly to the cost of the equipment and to the points of construction capable of giving trouble. In accordance with the present invention, catalytic masses are arranged on a different plan of set-up, and with great simplification of connections and valve control equipment. Other objects and advantages will appear as the description proceeds.

To the accomplishment of the foregoing and related ends, the invention, then, comprises the features hereinafter fully described, and particularly pointed out in the claim, the following description and the annexed drawing setting forth in detail certain illustrative embodiments of the invention, these being indicative however, of but a few of the various ways in which the principle of the invention may be employed.

In said annexed drawing:

Fig. 1 is a vertical sectional view showing apparatus embodying the invention; Fig. 2 is a transverse sectional view taken on a plane substantially indicated by line II—II, Fig. 1; and Fig. 3 is a sectional detail on smaller scale on a plane substantially indicated by line III—III, Fig. 2.

Within a suitable enclosing shell or casing 2 a plurality of concentric walls 3 is arranged, these being gas-pervious, as of screen mesh or perforated sheet metal, the openings being of a size to prevent passage of the catalytic material in granulated or pelleted form or the like. The catalytic material C is filled into alternate spaces between the concentric pervious walls, thereby constituting a series of thin, deep, annular bodies of catalyst with intervening spaces 4 between.

Certain of the annular spaces, preferably alternate spaces 6, are supplied with connections 5, for feed of gasiform material to be catalyzed, and regenerating gas, alternately, leading through suitably valved branches. The laterals from the connection header 5 into the alternate spaces 6 are sufficiently tight to the contiguous portion of the walls 3 to allow the catalyst mass to be over-filled and thereby seal the spaces against possible by-passing in event of shrinkage or settling of the catalyst mass.

Within the annular paces heat exchange piping is placed in suitable arrangement, a preferred form involving headers or manifolds 9, 9', at the bottom for inlet and headers or manifolds 11, 11', also at the bottom for discharge of heating and cooling exchange fluid, and vertical loops 10, shown in dash lines in Figs. 1 and 2 to avoid confusion, extend from the inlet headers 9, 9', to the outlet heads 11, 11'. As the manifolds thus are at the bottom, except for one feed inlet manifold at the top, the construction is of such open character that by removing the top of the container, held by any suitable means, the catalyst material may simply be dumped in and thereby fill the annular cell-spaces with sufficient surplus at the top, as above-noted, and as no heat transfer tubes cross through the annular spaces, there is no obstruction to cause bridging or jamming of the catalyst as thus filled in. On replacing the cover, the device is ready for operation.

The manner of operation of the apparatus will be readily understood from the foregoing. For example, hydrocarbon vapors to be aromatized are supplied by suitable valved line and through the feed connections 5 and pass down in the feed spaces 6 between the annular catalyst masses and progressively distribute therethrough to the next spaces which are open below and from whence the products proceed from the lower end through the connection 7 to a condenser system or other disposal equipment. The temperature suitable is maintained by the heat exchange coils. When regeneration is required, the feed of hydrocarbon is shut off, and a regenerating gas, as for instance air, which may be admixed with inert combustion gases, is passed in by its suitable valved line and through the connection 5, and distributing through the spaces between catalyst masses progressively envelops the catalyst particles in the masses, and finally proceeds out below by connection 7 to discharge to a suitable valved vent connection.

Other modes of applying the principle of the invention may be employed, change being made as regards the details described, provided the features stated in the following claim, or the equivalent of such, be employed.

I therefore particularly point out and distinctly claim as my invention:

Catalytic reaction apparatus for carrying out catalytic reactions of hydrocarbon gases and for regeneration of catalyst by an oxygen-containing gas, in alternate cycles, comprising a casing having a removable top, gas pervious annular walls spaced apart to define annular induction channels therebetween, said channels being closed at the bottom, pipes connected to the tops of said annular induction channels for delivering gaseous material to be catalyzed into said channels and for delivering an air containing gas thereinto on the next cycle, other gas pervious annular walls intervening between said first set of annular walls, for defining a set of annular eduction channels closed at the top and opening downwardly, said annular walls extending to a level below the top of the casing and thereby cooperating to define annular, open-topped spaces into which catalytic material may be placed when the top of the casing is removed, with the catalytic material extending above and over the top of said annular eduction channels to form a reserve supply of catalyst for filling any voids that may occur therein, due to settling, and heat exchange pipes in said annular induction and eduction channels for alternately supplying cooling and heating exchange liquid during the catalytic reaction cycle and the catalytic regeneration cycle.

EINAR KROPP.

REFERENCES CITED

The following references are of record in the file of this patent:

UNITED STATES PATENTS

| Number | Name | Date |
|---|---|---|
| 1,682,787 | Jaeger | Sept. 4, 1928 |
| 1,850,398 | Jaeger | Mar. 22, 1932 |
| 2,234,169 | Houdry | Mar. 11, 1941 |
| 1,895,063 | Zurcher | Jan. 24, 1933 |
| 2,079,935 | Frey | May 11, 1937 |
| 2,279,153 | Wilcox | Apr. 7, 1942 |
| 2,149,300 | Lassiat | Mar. 7, 1939 |
| 628,534 | Haefner | July 11, 1899 |
| 461,303 | Andrews | Oct. 13, 1891 |